Jan. 16, 1968     I. BREDAEL ETAL     3,364,360
ELECTROMECHANICAL DEVICE GENERATING TRAINS OF
FREQUENCY MODULATED PULSES
Filed Nov. 18, 1964

INVENTORS
Ivo BREDAEL
Franco SCIUTO

ATTORNEYS

United States Patent Office 3,364,360
Patented Jan. 16, 1968

3,364,360
ELECTROMECHANICAL DEVICE GENERATING
TRAINS OF FREQUENCY MODULATED PULSES
Ivo Bredael, Besozzo, and Franco Sciuto, Sesto Calende,
Italy, assignors to European Atomic Energy Community—Euratom, Brussels, Belgium
Filed Nov. 18, 1964, Ser. No. 412,109
Claims priority, application Belgium, Feb. 19, 1964,
516,775
4 Claims. (Cl. 250—233)

The present invention refers to an electromechanical device for generatnig trains of frequency modulated pulses, comprising a rotating mechanical component or disc rotating at a constant speed and having converting elements wherein the number of the said elements is proportional to the pulses of a train, for the sequential control of the feeding of a pulse generator.

One of the objects of this invention consists in a device of this type for the remote control of a step-by-step motor operating at a variable angular speed according to a sinusoidal law, directed mainly to the control of a mechanical oscillator of a nuclear reactor.

As it is known, in a general way, the known embodiments of the devices of the above-mentioned type, foresee a rotating component which presents a radial arrangement and with uniform distribution of the control elements of the pulse generator, and which is kinematically coupled to the control driving shaft by means of a universal joint which, is provided with an angular speed different from the one of the driving shaft, enables the generator to carry out a sequence of interventions according to a sinusoidal law.

According to an electro-optical embodiment of the device, the rotating component is a disk having a number of equal radial slits, equally spaced on a circumference, corresponding to the pulses of a train, these slits provoking, successively, by the interception of a ray from a light source, the excitation of the photo-electric cell and the generation of a train of sinusoidally frequency modulated pulses, for every turn of the control shaft.

The known devices present the disadvantage. On account of the use of universal joint transmission, they have a limited precision, because the mechanical play inherent to the joint, increases by wear, and adds to the unevenness of the transmission due to shocks which can be verified during the rotation. They comprise angular errors which have consequential effects on the uniformity of the pulse sequence and on the steadiness of the number of pulses per rotation of the control shaft.

Another disadvantage is caused by the limitation of the rotation speed which is imposed in order to eliminate the vibrations and flexions of the shafts during the rotation, and which limits the possibilities of use of these devices as pulse generators.

Another more important disadvantage, limiting the use of these known devices, resides in the low value of the proportion between the maximum frequency and the means frequency, called "depth of modulation," which is a function of the value of the inclination angle of the driving shaft and of the transducer shaft, which must be kept below $\pi/4$ on account of the mechanical characteristics of the joint.

The object of the present invention is a device generating pulses of the above-mentioned type which comprise a rotating component or disc, of a new and simple conception, which permits the direct coupling of the control driving shaft eliminating the inherent disadvantages caused by the universal joint coupling of the known embodiments.

The principal object of the invention is the embodiment of a device such as mentioned above, which, due to the parallel arrangement of the control elements on the rotating component according to a perpendicular preferential direction to the axis of rotation can carry out sequences of interventions on the pulse generator with a considerable precision and according to different frequency modulations.

Another object of the invention is the embodiment for such a device, of a rotating component which permits to set a number of pulses per rotation of the control shaft.

Another object of the embodiment of such a device comprises equidistant control elements which provide trains of pulses wherein the frequency modulation presents the maximum value of the proportion between the maximum and the means frequencies.

The device is characterized by the fact that the rotating component or disc comprises converting or control elements which are rectilinear and parallel to a line perpendicular to the rotation axis of the said component.

According to another characteristic, the parallel control elements are equidistant.

Other details and particularities of the invention will arise from the following description by means of nonlimitating examples and with reference to the appended drawing wherein.

Figure 1:
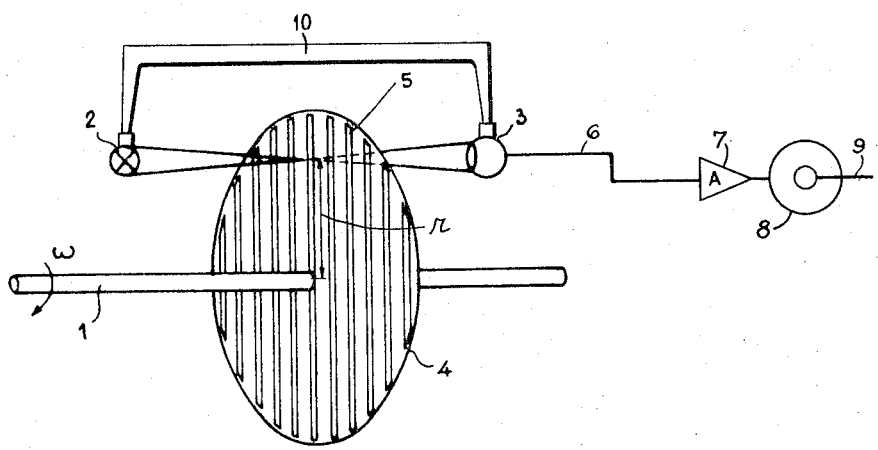
FIGURE 1 illustrates schematically the electro-optical device according to the invention.

The control shaft 1 has a constant angular speed $\omega$, 2 represents a lamp operating (by means of a screen not shown on the drawing) in a punctual or linear luminous focus, 3 represents a photo-electric cell, receiving through the slits of the disk 4 the light coming from the lamp, which is placed opposite the cell and similarly at a distance $r$ from the axis of the shaft 1.

According to the invention, the disk 4, which is driven by the shaft 1 at a speed $\omega$, has equidistant slits of equal width, parallel to one of its diameters.

The time intervals between the successive interceptions of the light ray from the lamp 2 through the slits on the disk are variable according to a sinusoidal law; the arrangement of the slits 5 permits the sinusoidal modulation of the trains of pluses produced by the cell 3. The output 6 of the cell 3 may be amplified by an amplifier 7.

It is noticed that, each slit producing two interventions on the cell during one rotation of the disk, the number of necessary slits to determine a fixed number of pulses is decreased by one half, which simplifier still more the embodiment of the slits in view of the known embodiments having a radial arrangement of the slits.

Furthermore, the parallel arrangement of the slits enables to obtain the variation of the number of pulses per rotation of the shaft by a simple change of the distance $r$ where the lamp 2 and the cell 3 are placed.

Figure 2:
FIGURE 2 illustrates a train of electric pulses, wherein the frequency and the pulse width vary sinusoidally.
Figure 2:
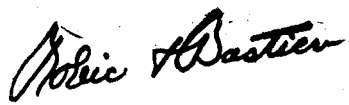

It is to be noted that in the illustrated electro-optical device, the light source may be punctual or linear. If the light source is punctual, the light received by the cell varies almost sinusoidally at an almost constant amplitude as shown in FIGURE 2. If the linear source which is parallel to the plane of the disk, is parallel to a radius of the latter, the light received presents the minimum amplitude corresponding to the minimum frequency. If the linear source is parallel to a chord of the disk, the light received presents a maximum amplitude corresponding to a minimum frequency.

In the latter cases, the arrangement which enables to obtain the superposition of an amplitude modulation on a frequency modulation of the pulses is analogous respectively to a frequency linear gain pickup followed by a differentiation circuit in the first case, and to a frequency linear gain pickup followed by an integration circuit in the second case.

It is to be noticed in the latter case, where the linear source is parallel to a cord of the disk, the sinusoidal amplitude variation presents an almost constant slope, at a constant speed of the driving shaft, for the full range of the frequencies; which permits the use in the cases wherein a strong amplification of a given signal by the cell is required (numerous slits having narrow width) of an alternative current amplifier 7, at the output of which an amplified signal can be introduced, which, of a constant amplitude and in constant phase relation with the signal of the cell, can be sent to a successive shaping circuit.

It should be also noticed that the arrangement lends itself particularly, in view of the facility of choice of the number of pulses per rotation and due to the fact that the speed of rotation of the disc is not limitative, to the use of sinusoidal oscillator of a nuclear reactor for the control of a step-by-step motor 8 which controls the element directed to create in the reactor the flux modulation of the neutrons. The motor 8 actuates a shaft 9 at a variable speed according to a sinusoidal law. The frame 10 rigidly connects elements 2 and 3 and provides for simultaneous vertical movement of these elements as desired. In fact, the latter, a combustible element for example, must be able to produce in the center of the reactor, a pseudo-sinusoidal path wherein the amplitude corresponding to the number of discharged pulses per rotation of the disc, and wherein the frequency corresponding to the number of rotation per unit of time of the disc are variable.

The invention has been described in referring to a particular embodiment; it is nevertheless obvious that it is not limited to the latter and that various possible modifications fall within the frame of the invention.

The control or converting elements of the pulse generator corresponding to the slits 5 of the illustrated example, can in other types of transducer (for example of the electrical, magnetic, or capacitive type), be of a different embodiment; nevertheless it must satisfy an analogous parallel arrangement of converting elements intercepting a directional radiation or the lines of force of a stationary field.

Furthermore, instead of equidistant slits, other distributions of parallel slit can be foreseen in order to obtain other variations of frequency modulation.

We claim:

1. An electromechanical device for generating trains of sinusoidally frequency modulated pulses, comprising a lamp permanently emitting light, a motor-driven mechanical disc in front of the lamp, rotating at constant speed and comprising light-transmissive elements parallel to a perpendicular direction to the axis of rotation of the disc, a photo-electric cell disposed behind said disc in line with said lamp for exploring the disc along a circular line, means to displace the lamp and the photo-electric cell simultaneously in a plane parallel to the disc in order to vary the radius of the exploration circle, and pulse feeding terminals at the output side of the photo-electric cell.

2. A device according to claim 1, wherein the elements are equidistant.

3. A device according to claim 2, wherein the elements are of equal width.

4. A device according to claim 3, wherein the elements extend substantially over the entire disc.

No references cited.

ORIS L. RADER, *Primary Examiner.*

B. A. COOPER, *Assistant Examiner.*